Aug. 12, 1969     M. T. FOLBRECHT     3,460,778

MANUAL-ELECTRIC FISHING REEL

Filed March 18, 1966     2 Sheets-Sheet 1

INVENTOR.
MELVIN T. FOLBRECHT,
BY
*Berman, Davidson + Berman*
ATTORNEYS.

Aug. 12, 1969  M. T. FOLBRECHT  3,460,778
MANUAL-ELECTRIC FISHING REEL
Filed March 18, 1966  2 Sheets-Sheet 2

INVENTOR.
MELVIN T. FOLBRECHT,
BY
Berman, Davidson & Berman
ATTORNEYS.

р
3,460,778
MANUAL-ELECTRIC FISHING REEL
Melvin T. Folbrecht, Rte. 3, Box 192,
Fort Pierce, Fla. 33450
Filed Mar. 18, 1966, Ser. No. 535,426
Int. Cl. A01k 89/00, 89/02
U.S. Cl. 242—84.2      3 Claims

ABSTRACT OF THE DISCLOSURE

A spinning reel is provided with a main housing supporting a transversely slidable casing, one side of the casing carrying an electric motor coupled through gearing to a first bevel gear, the other side of the casing carrying a hand crank and second bevel gear. A manually-operated crankshaft is selectably engageable with the bevel gears to slide the casing so that one or the other bevel gears meshes with winding mechanism of the reel to afford manual or electric motor drive. The windings mechanism includes a driven shaft and notched winding drum selectively moved between casting and winding positions by a suitable manually operable lever. The spool of the reel is held normally non-rotatable by an adjustable brake.

---

This invention relates to fishing rod reel devices, and more particularly to a fishing reel which may be selectively operated either electrically or manually.

The main object of the invention is to provide a novel and improved reel attachment for a fishing rod, the reel attachment being arranged with means for operating same either manually or by self-carried electric motor drive means, the device being relatively simple in construction, being compact in size, being light in weight, and being easy to operate.

A further object of the invention is to provide an improved fishing reel which may be either manually or electrically operated, as desired, the fishing reel being relatively inexpensive to manufacture, being durable in construction, being arranged so that it can be controlled by relatively simple manipulations, having substantial lifting power, being convertible from manual drive to electrical drive, and vice-versa, with minimum frictional loss, and being operable with the use of only one hand.

A still further object of the invention is to provide an improved fishing reel mechanism which may be either electrically operated or manually operated, as desired, the mechanism being easy to install on a fishing rod, being operable by only a single hand of the user, namely, the same hand which grasps the handle of the associated fishing rod, and being arranged so that its parts may be easily reversed so that the driving motor and associated gearing may be mounted on either side of the reel portion of the mechanism, as desired.

Further objects and advantages of the invention will become apparent from the following description and claims, and from the accompanying drawings, wherein:

Figure 1:
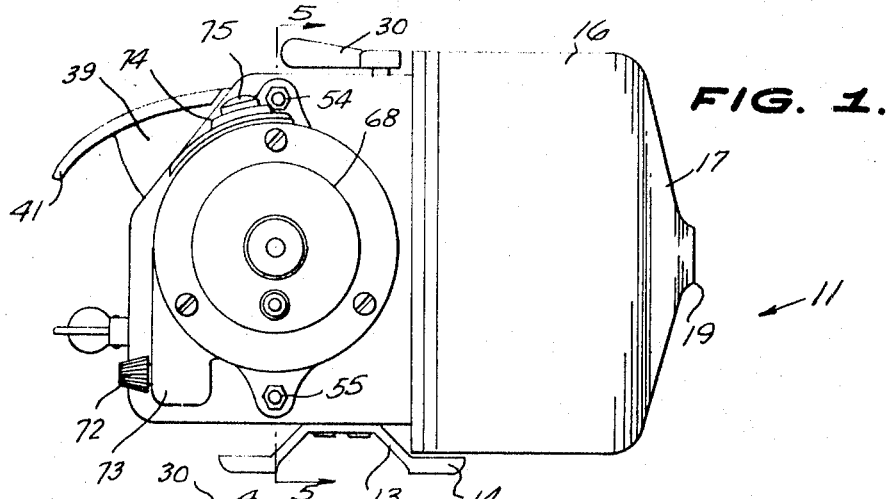
FIGURE 1 is a side elevational view of an improved fishing reel mechanism constructed in accordance with the present invention.

Referring to the drawings, 11 generally designates an improved fishing feel mechanism constructed in accordance with the present invention. The mechanism 11 comprises a main housing 12 having a conventional fishing pole attachment bracket 13 rigidly secured to its bottom wall so that it may be suitably mounted on a fishing pole with the respective downwardly concave opposite end legs 14, 14 receiving the pole and being suitably clamped thereto.

Figure 4:
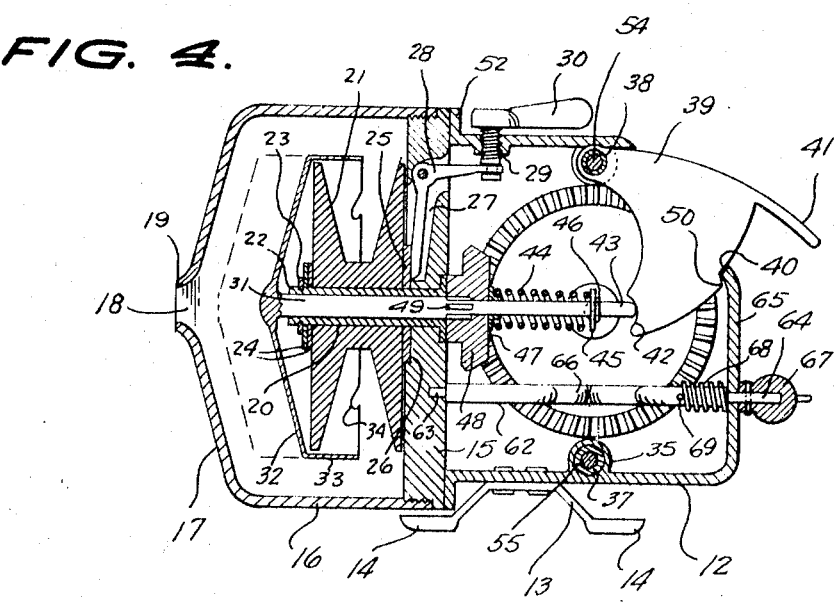
FIGURE 4 is a longitudinal vertical cross-sectional view of the mechanism taken substantially on the line 4—4 of FIGURE 2.

The housing 12 is provided with the substantially circular transversely extending front wall 15, and threadedly secured on the periphery of the relatively thick circular housing front wall 15 is a dome-shaped reel cover 16 provided with the forwardly convergent front wall 17, said front wall 17 being generally conical in shape and being provided at its apex portion with a fishing line guide aperture 18 which is surrounded by an annular forwardly converging guide collar 19, as is clearly shown in FIGURE 4. Rigidly secured to wall 15 is an axial, forwardly projecting tubular reel-supporting shaft 20 on which is rotatably mounted the peripherally grooved fishing reel 21. The sleeve 20 is provided at its forward end with the enlarged annular retaining rib 22 and is annularly grooved adjacent thereto to receive a locking ring 23 which retains a pair of bearing washers 24 adjacent to the forward surface of the reel 21, as shown in FIGURE 4. Reel 21 is thus rotatably retained between the washers 24 and opposite bearing washer 25 surrounding sleeve 20 and received in a suitable recess 26 provided therefor in wall 15. Wall 15 is provided with a further recess 27 communicating with recess 26 in which is pivoted a bell crank lever 28 having one arm bearing against washer 25 and the other arm rotatably connected to a screw member 29 threadedly engaged through the top wall of housing 12 and having an external operating arm 30.

By rotating screw member 29 by means of operating arm 30 the bell crank lever 28 may be rotated to adjust the bearing pressure exerted on the washer 25, whereby to correspondingly adjust the frictional braking force applied to the reel 21, as will be presently described.

As will be apparent from FIGURES 1, 2, 3 and 4, the lever 30 is located in a position so that it may be easily engaged by the thumb of the user's hand while the hand is grasping the associated fishing rod, in the event that the user wishes to vary the amount of frictional force exerted by washer 25 on reel 21 during the unwinding of fishing line from the reel. Bell crank lever 28 may be operated by means of lever 30 even to apply sufficient force to washer 25 to completely stop the fishing reel 21 from rotating on the sleeve 20, if so desired.

Rotatably and slidably mounted in the tubular shaft 20 is a longitudinally extending shaft member 31 having a generally conical, dome-like outer drum member 32 rigidly secured thereto, as shown in FIGURE 4, the drum member having a cylindrical skirt portion 33 in which a substantial portion of reel 21 is receivable, as shown in full line view in FIGURE 4. The skirt portion 33 is provided with notches 34 in its peripheral edge adapted to engage with the associated fishing line so as to wind the fishing line on to the reel 21 when the drum member 32 is rotated relative to the reel 21 with the parts in their full line positions shown in FIGURE 4. Thus, the reel 21 may be locked against rotation by operating the locking lever 30 in the manner above described, namely, to wedge the washer 25 against the reel to prevent rotation thereof. Thereafter, the drum member 32 may be rotated to cause the associated fishing line to be wound up on the reel. When the drum member 32 is moved forwardly from the position shown in FIGURE 4 in full line view to the dotted view position thereof, the skirt portion 33 is located sufficiently forwardly of the reel 21 to prevent engagement of notches 34 with the fishing line, whereby the line may be freely unwound from the fishing reel when the fishing reel is in a released condition, namely, when rotation of the fishing reel on the tubular supporting shaft 20 is permitted by releasing the friction washer 25, namely, by operating lever 30 to a release position.

Housing 12 is provided on its bottom wall with an integral transverse guide sleeve 35 rising from said bottom wall, as shown in FIGURE 4, and by a pair of aligned transverse depending sleeves 36, 36 formed integrally with its top wall and overlying the lower guide sleeve 35. A bottom spacer sleeve 37 is slidably engaged in the sleeve 35, the spacer sleeve 37 being substantially longer than sleeve 35, as is clearly shown in FIGURE 5. Another spacer sleeve 38 is slidably mounted in the upper sleeve members 36, 36, the spacer sleeve 38 being substantially of the same length as the spacer sleeve 37. The upper sleeve 38 is peripherally grooved between the sleeves 36, 36, and rotatably mounted on the peripherally grooved intermediate portion of sleeve 38 is an arm 39 which projects outwardly from the upper rear portion of housing 12 through an aperture 40. As shown in FIGURE 4, the arm 39 is provided with a downwardly and rearwardly curved thumb-actuating tab 41 so that it may be readily engaged by the thumb of the hand grasping the associated fishing rod. The arm 39 is formed at its lower portion with an arcuately curved notch or recess 42 which is engaged by the reduced rear end portion 43 of the shaft 31, being urged thereagainst by a coil spring 44 surrounding the reduced portion 43 and bearing against a washer 45 surrounding shaft portion 43 and retained thereon by a locking ring 46. The forward end of washer 45 bears against an annular bearing collar 47 surrounding the shaft portion 43 and which in turn bears against a bevel gear 48. Shaft 31 and gear 48 are provided with interengaging splines 49 which are normally lockingly, interengaged and are retained in driving interengagement by the action of the biasing spring 44. However, when the arm 39 is rotated in a clockwise direction, as viewed in FIGURE 4, the shaft 31 is pushed forwardly against the biasing force of spring 44, moving the dome-like member 32 from the full line position thereof toward the dotted view position thereof shown in FIGURE 4 and disengaging the splines of shaft 31 from the splines of bevel gear 48 so that bevel gear 48 is no longer in driving engagement with shaft 31.

Figure 5:
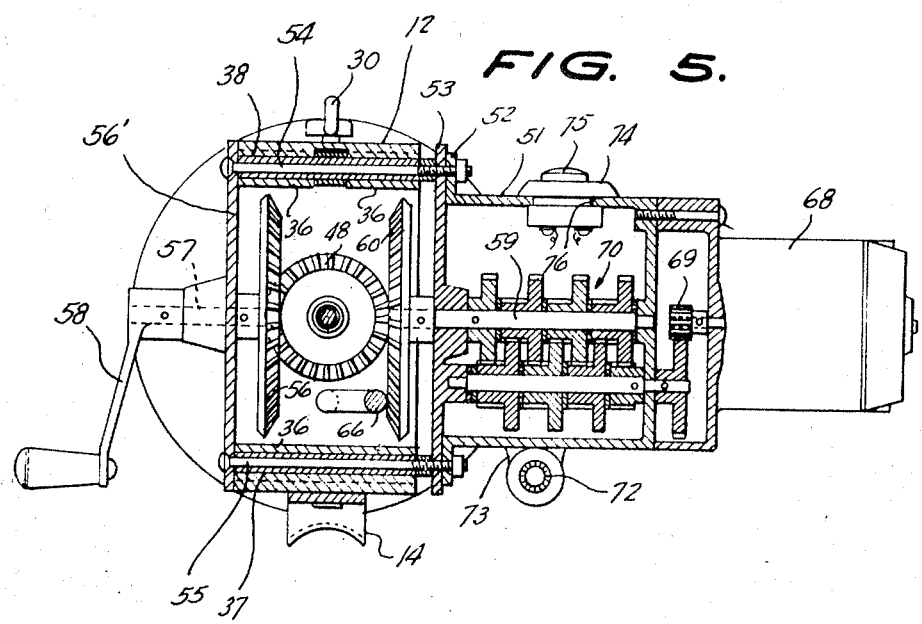
FIGURE 5 is a transverse vertical cross-sectional view taken substantially on the line 5—5 of FIGURE 1.

Rearward rotation of arm 39 is limited by the provision of a stop shoulder 50 on the bottom edge of the arm which is engageable with the margin of the rear wall of housing 12 adjacent to the aperture 40, as shown in FIGURE 4. Designated at 51 is a gear housing provided with an outwardly extending marginal flange 52 which is clamped against a housing end wall plate 53 by top and bottom fastening bolts 54 and 55 engaged through the respective sleeves 38 and 37, the heads of the bolts bearing against a side plate 56' which is thus clamped against the ends of the spacer sleeves 38 and 37, defining a rigid frame work which is slidable laterally in the pair of top housing sleeves 36, 36 and in the bottom housing sleeve 35. FIGURE 5 shows this frame work moved to its extreme rightward position wherein the plate member 53 is spaced away from the right end of housing 12. In this position the bevel gear 48 meshes with a larger bevel gear 56 mounted on a transverse shaft 57 journaled in the wall 56', the outer end of shaft 57 having a crank handle 58 secured thereto so that bevel gear 56 can be manually rotated, thus rotating shaft 31 and drum member 32. With the parts thus arranged and with reel 21 locked against rotation by operating lever 30 in the manner above described, the associated fishing line may be wound up on reel 21 by rotating the crank handle 58.

Journaled in plate member 53 in alignment with shaft 57 is another shaft 59 on which is secured a bevel gear 60 similar to and opposing the bevel gear 56 and being meshingly engageable with bevel gear 48 when the aforesaid rigid frame structure comprising plates 56 and 63 and spacer sleeves 38 and 37 is moved leftward from the position of FIGURE 5 to a position wherein plate 53 substantially engages the right side of housing 12. Under these conditions, bevel gear 56 is disengaged from bevel gear 48 and bevel gear 48 is drivingly engaged and is in mesh with bevel gear 60. Shifting of the frame work is accomplished by the provision of a shaft 62 having a reduced end portion 63 journaled in the wall 15 and an opposite reduced end portion 64 extending through and rotatably supported in the outer end wall 65 of housing 12. Shaft 62 extends substantially parallel to shaft 31 and is provided at its intermediate portion with a rigid loop 66 which is of sufficient radial length relative to shaft 62 to be engageable with the gears 56 and 60 and to thereby shift the rigid frame work above described responsive to such engagement.

An operating handle 67 is secured to the outer end of reduced shaft portion 64. A coil spring 68 surrounds shaft 62, bearing between wall 65 and a retaining pin 69 on the shaft, the spring 68 providing frictional braking force which holds the shaft in a selected position of adjustment thereof until it is readjusted by suitably rotating the handle 67. Thus, in the position shown in FIGURES 4 and 5, the loop 66 is engaged with the bevel gear 60 and the rigid frame work carrying bevel gears 56 and 60 is in its rightward position wherein bevel gear 56 meshes with bevel gear 48. By rotating the handle 67 in a counterclockwise direction, as viewed in FIGURE 2, through 180 degrees, the loop 66 may be brought into engagement wtih the bevel gear 56 to move the frame work leftwards, causing bevel gear 56 to disengage from bevel gear 48 and bringing bevel gear 60 into meshing engagement with said bevel gear 48.

Figure 2:
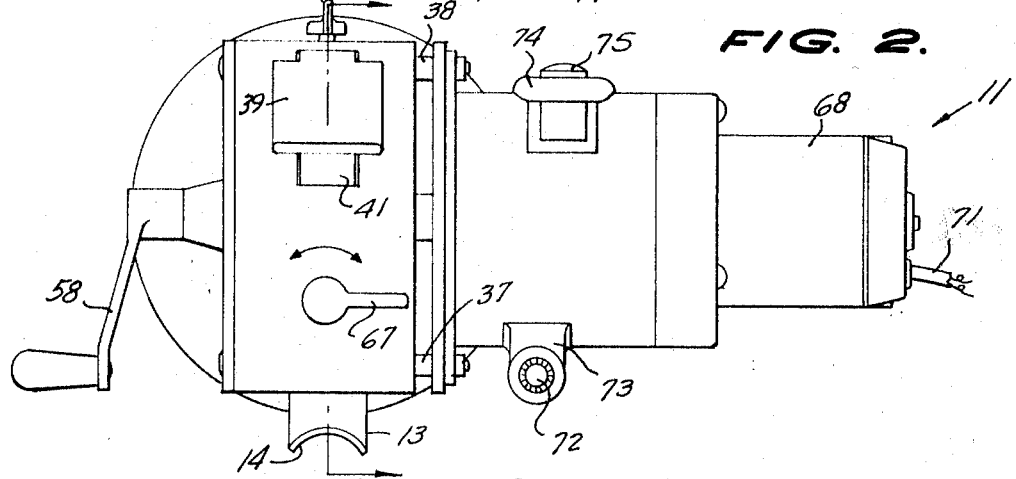
FIGURE 2 is a rear end elevational view of the fishing reel mechanism of FIGURE 1.
Figure 3:
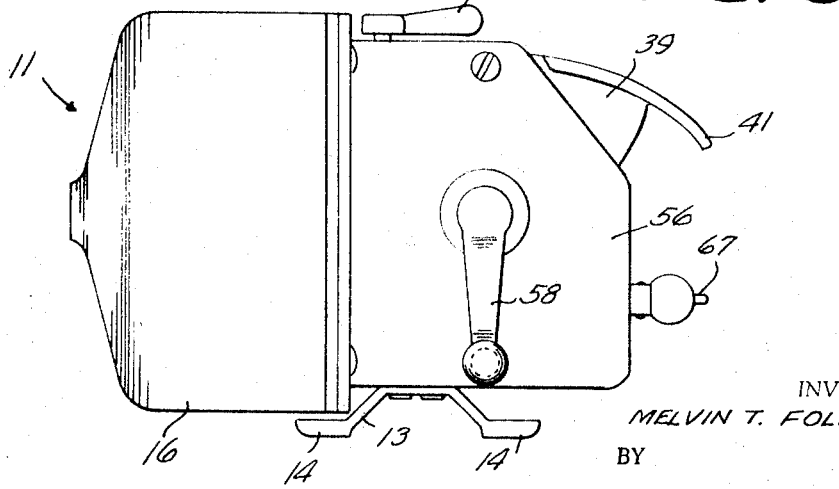
FIGURE 3 is a side elevational view of the mechanism of FIGURES 1 and 2, taken from the side opposite that for FIGURE 1.

As shown in FIGURE 2, the operating lever 67 is located so that it may be readily engaged by the thumb of the hand grasping the fishing rod.

Designated at 68 is an electric motor which is mounted on the outer end of the gear housing 51 and which is provided with a drive pinion 69. The drive pinion 69 is drivingly coupled to shaft 59 through a suitable reduction gear train 70 contained in the gear housing 51. The electric motor 68 may be energized from a suitable battery carried by the fisherman in a pocket or any other suitable receptacle, such as a shoulder bag, the motor being connected to the current source by means of a suitable cable 71. The motor is provided with a speed-adjusting rheostat 72 mounted on a bracket 73 secured to and depending from the bottom of gear housing 51, the control knob being readily accessible for adjustment by the thumb of the hand grasping the associated fishing rod.

The motor 68 is likewise provided with an operating switch 74 which is adjustably mounted in the top wall of housing 51 so that it may be rotatably adjusted to bring its actuating button 75 within convenient reach of the user's thumb. Thus, the operating switch 74 may be mounted in an arcuate slot 76 provided in the top wall of housing 51, the slot subtending a sufficient radial angle so that the switch 74 may be moved to a convenient position around the axis of housing 51, namely, to a position wherein the operating button 75 may be readily engaged by the thumb of the hand grasping the associated fishing rod.

As will be readily apparent, when the associated fishing rod is to be unreeled, for example, during casting, brake lever 30 is moved to release position and lever 39 is actuated to move the cover drum 32 to the dotted view position thereof shown in FIGURE 4, which exposes the fishing line and allows it to unwind freely. A desired amount of braking force may be applied to the reel by suitably operating the brake control lever 30. Thus, when the line is being run out after a strike, the lever 30 may be operated to regulate the frictional force exerted on the reel 21, and to thereby control the resistance of the reel.

When the line is to be rewound on the reel, this can be done either manually or by employing the electric motor 63. For manual rewinding the lever 67 is operated to the position thereon shown in FIGURE 2, whereby the gear 48 is in mesh with the bevel gear 56 so that the crank handle 58 is coupled to the shaft 31. Rotation of shaft 31 causes a notch 34 to engage with the line and to wind it up on the reel, with the reel held against rotation by suitable adjustment of arm 30 to its locking position.

To employ motor 68 for rewinding, lever 67 is rotated 180 degrees from the position thereof shown in FIGURE 2, whereby to bring bevel gear 60 into mesh with bevel gear 48, and whereby to drivingly couple shaft 31 to the motor pinion gear 69 to the gear train 70. By then operating the control switch 74 by means of its actuating button 75, the motor 68 will be energized and the shaft 31 will be rotated to cause the fishing line to be wound up on reel 21.

While a specific embodiment of an improved fishing reel assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a fishing reel assembly, a main support, means to mount said main support on a fishing rod, a tubular shaft mounted on said main support, a spool journaled on said shaft, an auxiliary shaft rotatably and slidably-mounted in said tubular shaft, a drum member secured to the forward end of said auxiliary shaft adjacent said spool, said spool being receivable in said drum member, means on the periphery of said drum member engageable with a fishing line on the spool to wind the line on the spool responsive to rotation of the drum member relative to the spool, a gear slidably-mounted on said auxiliary shaft, interengageable drive means on the gear and the auxiliary shaft, means biasing said auxiliary shaft into driving engagement with said gear, means limiting forward movement of said gear on said auxiliary shaft, said biasing means acting between said gear and the rear portion of said auxiliary shaft, said drum member receiving said spool when the gear is in driving engagement with the auxiliary shaft, transversely-movable drive means on the support located so as to be coupled to said gear in one position thereof, means to at times move said last-named drive means away from said one position toward a second position wherein it is uncoupled from said gear, means engageable with the rear end of the auxiliary shaft to move the auxiliary shaft forwardly to release the auxiliary shaft from the gear and simultaneously move the drum member forwardly away from said spool, means to at times lock the spool against rotation relative to the support, wherein the means engageable with the rear end of the auxiliary shaft comprises an actuator arm pivoted to said support on an axis transverse to the auxiliary shaft, wherein the interengageable drive means comprises interengageable splines on the gear and the auxiliary shaft, wherein the means biasing the auxiliary shaft into driving engagement with the gear comprises annular abutment means on the rear end of the auxiliary shaft and a coiled spring surrounding the auxiliary shaft and bearing between said annular abutment means and said gear, wherein said transversely-movable drive means on the support comprises transverse guide means on the support, frame means slidably-mounted on said transverse guide means, respective transverse drive shafts journaled in said frame means on opposite sides of said gear, respective bevel gears on said transverse drive shaft selectively drivingly-rotatable with said first-named gear, means to manually-rotate one of said transverse drive shafts, an electric motor mounted on said frame means, and means drivingly-coupling said electric motor to the other transverse drive shaft, and means on the support to move the frame means on said transverse guide means between the positions wherein said bevel gears are drivingly-meshed with said first-named gear, wherein said last-named means comprises a shaft member journaled on said support parallel to said auxiliary shaft, and cam means on the intermediate portion of said last-named shaft member engageable with the inwardly-facing surfaces of said bevel gears to shift the frame means on said transverse drive means responsive to rotation of said last-named shaft member.

2. The fishing reel assembly of claim 1, and an operating actuator arm on the rear end of said last-named shaft member.

3. The fishing reel assembly of claim 2, and wherein the arm pivoted to the support on an axis transverse to the auxiliary shaft for engaging the rear end of the auxiliary shaft extends adjacent said last-named operating arm, whereby both arms are accessible for actuation by the same finger of the hand grasping a fishing rod on which the fishing reel assembly is mounted.

References Cited

FOREIGN PATENTS 8,033     1961    Japan.

BILLY S. TAYLOR, Primary Examiner

U.S. Cl. X.R.

242—84